US011891075B2

(12) United States Patent
Rocha et al.

(10) Patent No.: US 11,891,075 B2
(45) Date of Patent: Feb. 6, 2024

(54) REDUNDANT HARDWARE AND SOFTWARE ARCHITECTURE FOR AUTONOMOUS VEHICLES

(71) Applicant: TUSIMPLE, INC., San Diego, CA (US)

(72) Inventors: Frederic Rocha, San Diego, CA (US); Zehua Huang, San Diego, CA (US); Xiaoling Han, San Diego, CA (US); Ruiliang Zhang, San Diego, CA (US); Esayas Naizghi, Tucson, AZ (US); Changyi Zhao, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 636 days.

(21) Appl. No.: 16/910,012

(22) Filed: Jun. 23, 2020

(65) Prior Publication Data

US 2021/0394770 A1 Dec. 23, 2021

(51) Int. Cl.
*B60W 50/023* (2012.01)
*B60W 60/00* (2020.01)
*G06V 20/56* (2022.01)

(52) U.S. Cl.
CPC .... *B60W 50/023* (2013.01); *B60W 60/00186* (2020.02); *G06V 20/56* (2022.01); *B60W 2420/42* (2013.01); *B60W 2420/52* (2013.01)

(58) Field of Classification Search
CPC ......... B60W 50/023; B60W 60/00186; B60W 2420/42; B60W 2420/52; B60W 50/029; B60W 60/0018; B60W 2050/0297; B60W 2420/403; B60W 2420/62; G06V 20/56
See application file for complete search history.

(56) References Cited

U.S. PATENT DOCUMENTS

| 2013/0021447 | A1* | 1/2013 | Brisedoux ............ H04N 23/741 348/241 |
| 2015/0246678 | A1 | 9/2015 | Hauler |
| 2019/0258251 | A1* | 8/2019 | Ditty .................... G06V 20/58 |

(Continued)

FOREIGN PATENT DOCUMENTS

DE  10 2015 003124 A1  9/2016

OTHER PUBLICATIONS

European Patent Office, Extended European Search Report for EP 211808415, dated Mar. 23, 2022.

*Primary Examiner* — James J Lee
*Assistant Examiner* — Wenyuan Yang
(74) *Attorney, Agent, or Firm* — Perkins Coie LLP; Paul Liu

(57) ABSTRACT

A redundant hardware and software architecture can be designed to enable vehicles to be operated in an autonomous mode while improving the reliability and/or safety of such vehicles. A system for redundant architecture can include a set of at least two redundant sensors coupled to a vehicle and configured to provide timestamped sensor data to each of a plurality of computing unit (CU) computers. The CU computers can process the sensor data simultaneously based on at least a time value indicative of an absolute time or a relative time and based on the timestamped sensor data. The CU computers provide to a vehicle control unit (VCU) computer at least two sets of outputs configured to instruct a plurality of devices in a vehicle and cause the vehicle to be driven.

20 Claims, 5 Drawing Sheets

(56) References Cited

U.S. PATENT DOCUMENTS

| | | | |
|---|---|---|---|
| 2020/0117565 A1* | 4/2020 | Ponnuvel | G06F 11/263 |
| 2020/0148218 A1* | 5/2020 | Huang | G05D 1/0088 |
| 2020/0276973 A1* | 9/2020 | Meijburg | G08G 1/087 |

* cited by examiner

REDUNDANT HARDWARE AND SOFTWARE ARCHITECTURE FOR AUTONOMOUS VEHICLES

TECHNICAL FIELD

This document relates to systems, apparatus, and methods to process data from multiple sensors in a redundant architecture on an autonomous vehicle.

BACKGROUND

Autonomous vehicle navigation technology can allow a vehicle to sense the position and movement of vehicles around an autonomous vehicle and, based on the sensing, control the autonomous vehicle to safely navigate towards a destination. An autonomous vehicle may operate in several modes. In some cases, an autonomous vehicle may allow a driver to operate the autonomous vehicle as a conventional vehicle by controlling the steering, throttle, clutch, gear shifter, and/or other devices. In other cases, a driver may engage the autonomous vehicle navigation technology to allow the vehicle to be driven by itself.

SUMMARY

This patent document describes systems, apparatus, and methods for redundant hardware and software architectures to control devices on a vehicle. A system is disclosed comprising a set of at least two redundant sensors coupled to a vehicle, where each sensor is configured to obtain an image of or to measure information about a same region or substantially overlapping regions towards which the vehicle is being driven, and where each sensor is configured to send the image or the measured information to a first computing unit (CU) computer and a second CU computer; each of the first CU computer and the second CU computer located in the vehicle and comprising a processor configured to simultaneously perform operations comprising: receive, from each sensor, the image or the measured information; determine, from the image or the measured information, a set of output values configured to instruct a plurality of devices in a vehicle and cause the vehicle to be driven; send to a vehicle control unit (VCU) computer the set of output values; the VCU computer located in the vehicle and comprising a processor configured to: receive, from each of the first CU computer and the second CU computer, the determined set of output values; select either the set of output values from the first CU computer or the set of output values from the second CU computer to be used to control the plurality of devices; and send a set of commands that instruct the plurality of devices to operate the vehicle, wherein the set of commands are based on the selected set of output values.

In some embodiments, each of the first CU computer and the second CU computer comprises the processor that is further configured to perform the operations to: determine, from the image or the measured information, an emergency trajectory information that indicates a predicted trajectory of the vehicle over a known distance from a location of the vehicle to bring the vehicle to a complete stop; and send the emergency trajectory information to the VCU computer; where the VCU computer comprises the processor that is further configured to: receive, from each of the first CU computer and the second CU computer, the emergency trajectory information; and store the emergency trajectory information, wherein the stored emergency trajectory information is used when the first CU computer and the second CU computer generate messages indicative of an error or fault condition.

In some embodiments, the VCU computer comprises the processor that is further configured to: receive, from the first CU computer and the second CU computer, the messages indicative of the error or fault condition in the first CU computer and the second CU computer when performing the operations; and in response to receiving the messages: retrieve the stored emergency trajectory information; obtain, from a second set of at least two redundant sensors coupled to the vehicle, at least two images or at least two measured information of a same region or substantially overlapping regions towards which the vehicle is being driven; determine, based on at least one image or at least one measured information obtained from the second set of the at least two redundant sensors and the emergency trajectory information, a second set of output values that control the plurality of devices in the vehicle to bring the vehicle to a complete stop; and cause the vehicle to be brought to a complete stop by sending a second set of commands that instruct the plurality of devices, wherein the second set of commands are based on the second set of output values.

In some embodiments, the second set of commands cause an emergency lights of taillights located on the vehicle to be turned on. In some embodiments, the VCU computer comprises the processor that is further configured to: receive, from the first CU computer, a message indicative of an error or fault condition in the first CU computer when performing the operations; and in response to receiving the message: select the set of output values from the second CU computer to be used to control the plurality of devices; and send the set of commands that instruct the plurality of devices to operate the vehicle, wherein the set of commands are based on the selected set of output values from the second CU computer. In some embodiments, the processor of the VCU computer is configured to select either the set of output values from the first CU computer or the set of output values from the second CU computer based on a first state of health of the first CU computer or a second state of health of the second CU computer.

In some embodiments, the plurality of devices include a transmission, an engine, brakes, a steering system, or a light. In some embodiments, the set of the at least two redundant sensors include at least two cameras, at least two LiDAR sensors, at least two RADAR sensors, at least two infrared cameras, at least two ultrasonic sensors, or any combination thereof.

An apparatus for autonomous vehicle operation comprising a processor, configured to implement a method, comprising: receive, from each of a first computing unit (CU) computer and a second computing unit (CU) computer, a set of output values configured to instruct a plurality of devices in a vehicle and cause the vehicle to be driven, where the set of output values are determined based on an image or measured information provided by a set of at least two redundant sensors coupled to the vehicle; select either the set of output values from the first CU computer or the set of output values from the second CU computer to be used to control the plurality of devices; and send a set of commands that instruct the plurality of devices to operate the vehicle, wherein the set of commands are based on the selected set of output values.

In some embodiments, the processor is configured to implement the method that further comprises: receive, from the first CU computer and the second CU computer, messages indicative of an error or fault condition in the first CU computer and the second CU computer; and n response to receiving the messages: retrieve a stored emergency trajectory information that indicates a predicted trajectory of the vehicle over a known distance from a location of the vehicle to bring the vehicle to a complete stop; obtain, from at least two redundant cameras coupled to the vehicle, at least two images of a same region or substantially overlapping regions towards which the vehicle is being driven; determine, based on at least one image from the at least two redundant cameras and the emergency trajectory information, a second set of output values that control the plurality of devices in the vehicle to bring the vehicle to a complete stop; and cause the vehicle to be brought to a complete stop by sending a second set of commands that instruct the plurality of devices, wherein the second set of commands are based on the second set of output values.

In some embodiments, the processor is configured to implement the method that further comprises: receive, from the first CU computer, a message indicative of an error or fault condition in the first CU computer; and in response to receiving the message: select the set of output values from the second CU computer to be used to control the plurality of devices; and send the set of commands that instruct the plurality of devices to operate the vehicle, wherein the set of commands are based on the selected set of output values from the second CU computer. In some embodiments, the processor is configured to select the set of output values from the first CU computer based on a state of health of the second CU computer. In some embodiments, the set of the at least two redundant sensors include at least two cameras.

A non-transitory computer readable program storage medium having code stored thereon, the code, when executed by a processor, causing the processor to implement a method, comprising: receiving, from each of a first computing unit (CU) computer and a second computing unit (CU) computer, a set of output values configured to instruct a plurality of devices in a vehicle and cause the vehicle to be driven, wherein the set of output values are determined based on an image or measured information provided by a set of at least two redundant sensors coupled to the vehicle; selecting either the set of output values from the first CU computer or the set of output values from the second CU computer to be used to control the plurality of devices; and sending a set of commands that instruct the plurality of devices to operate the vehicle, wherein the set of commands are based on the selected set of output values.

In some embodiments, the method further comprises: receiving, from the first CU computer and the second CU computer, messages indicative of an error or fault condition in the first CU computer and the second CU computer; and in response to receiving the messages: obtaining an emergency trajectory information that indicates a predicted trajectory of the vehicle over a known distance from a location of the vehicle to bring the vehicle to a complete stop; obtaining, from at least two redundant cameras coupled to the vehicle, at least two images of a same region or substantially overlapping regions towards which the vehicle is being driven; determining, based on at least one image from the at least two redundant cameras and the emergency trajectory information, a second set of output values that control the plurality of devices in the vehicle to bring the vehicle to a complete stop; and causing the vehicle to be brought to a complete stop by sending a second set of commands that instruct the plurality of devices, wherein the second set of commands are based on a translation of the second set of output values. In some embodiments, the messages are received at different times.

In some embodiments, the method further comprises: receiving, from the first CU computer, a message indicative of an error or fault condition in the first CU computer; and in response to receiving the message: selecting the set of output values from the second CU computer to be used to control the plurality of devices; and sending the set of commands that instruct the plurality of devices to operate the vehicle, wherein the set of commands are based on a translation of the selected set of output values from the second CU computer.

In some embodiments, the set of output values from the second CU computer is selected in response to receiving the message and based on an analysis of a content of the message. In some embodiments, the set of the at least two redundant sensors include at least two LiDARs. In some embodiments, each sensor is configured to obtain the image of or to measure information about a same region or substantially overlapping regions towards which the vehicle is being driven.

In yet another exemplary aspect, the above-described method is embodied in a computer readable program stored on a non-transitory computer readable media. The computer readable program includes code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

Figure 1:
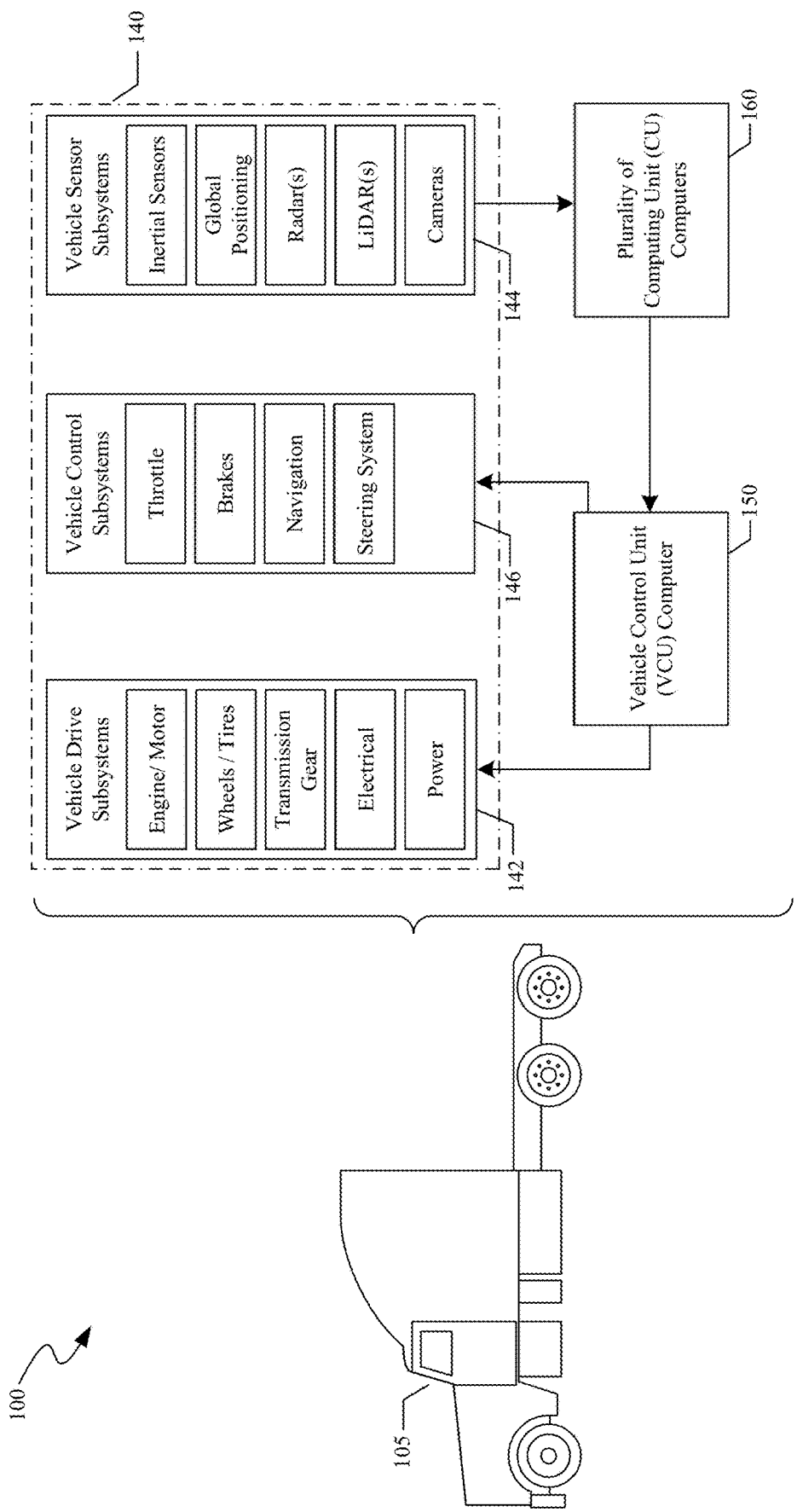
FIG. 1 shows a block diagram of an example vehicle ecosystem in which an exemplary hardware and software architecture can be implemented to control the autonomous vehicle.

Developments in automotive technology have led to a development of standards within the automotive community to advance the state of automotive technology and to use and/or design automotive equipment that is functionally safe. One such standard promulgated by the Society of Automotive Engineers (SAE) International is known as SAE J3016 that describes, among other things, levels of driving automation. Currently, SAE J3016 describes six levels of driving automation from Level 0 that is described to include very little automation (e.g., providing a blind spot warning) to Level 5 that is described to autonomous driving in all conditions. In Levels 0 to 2, a human driver is responsible for driving the vehicle, and in Levels 3 to 6, an on-board computer located in the vehicle is driving the vehicle when autonomous driving feature is engaged.

Another standard is known as ISO 26262, which is an international standard for functional safety of electrical and/or electronic systems in vehicles. The ISO 26262 standard describes, among other things, four Automotive Safety Integrity Levels (ASIL) that describe four levels of inherent safety risk in an automotive system or a component of such a system. The four ASIL levels range from ASIL A, which represents the lowest degree of automotive hazard, to ASIL D, which represents the highest degree of automotive hazard. Automotive components/devices and systems can be designed to comply with one or more of the ASIL levels. For example, the rear taillights may be designed to be compliant to ASIL A features, whereas the airbags may be designed to be compliant to ASIL D feature that can make such airbags implicitly complaint with the lower ASIL levels A, B, and C.

Each ASIL level can be described by metrics are describe a number of faults for a component that are covered by or dealt with a safety feature on the automotive component or system. An ASIL B component can have a single point fault metric of greater than a certain percentage (e.g., 90%) and an ASIL D component can have a single point fault metric of greater than that of ASIL B (e.g., 99%). Thus, for an ASIL D component, as an example, 99% of faults can be covered by or dealt with a safety feature on the automotive component or system. An electrical system can be designed to comply with ASIL D by having, for example, two ASIL B components operating in a redundant scheme. This patent document describes, among other features, automotive components and/or systems that enable a vehicle to be driven autonomously, where the hardware and software architecture of automotive components can be designed to meet the redundancy feature of ASIL D.

Conventional architecture to control autonomous vehicles uses complex safety monitoring systems on computers setup in a lockstep architecture. A conventional lockstep architecture can use three computers to determine whether the calculations being performed by each of the three computers are correct and that there are no failures. The output of each of the three computers are compared and then a voting technique is employed to determine if at least two of the three outputs from the three computers are the same or within a range of tolerance. Such a lockstep architecture can be costly and technically complex to implement. Furthermore, a conventional architecture can be subject to additional costs and implementation complexities when it uses only ASIL D components for performing autonomous driving related computations. This patent document describes exemplary hardware and software architectures that can overcome at least the drawbacks of conventional architecture to control autonomous vehicles by using, for example, a plurality of computing unit (CU) computers operating in a redundant architecture with a vehicle control unit (VCU) computer that can determine, based on information received by the VCU computer, which outputs to use from the outputs provided by the plurality of CU computers.

FIG. 1 shows a block diagram of an example vehicle ecosystem 100 in which an exemplary hardware and software architecture can be implemented to control the autonomous vehicle. The vehicle ecosystem 100 includes several systems and components that can generate and/or deliver one or more sources of information/data and related services to the VCU computer 150 and the plurality of CU computers 160. The VCU computer 150 and the CU computers 160 may be located in a vehicle 105. Examples of vehicle 105 include a car, a truck, or a semi-trailer truck. The VCU computer 150 and the CU computers 160 can be in data communication with any one or more of the plurality of vehicle subsystems 140, all of which can be resident in a user's vehicle 105. As further explained in this patent document, each of the plurality of CU computers 160 can receive and process data from sensors from the vehicle sensor subsystem 144 and send an output to the VCU computer 150. Based on at least the information provided by the CU computers 150 to the VCU computer 150, the VCU computer 150 can generate outputs to control one or more components of the vehicle drive subsystems 142 and/or the vehicle control subsystems 146.

The vehicle 105 includes a plurality of vehicle subsystems 140 that support of the operation of vehicle 105. The vehicle subsystems 140 may include a vehicle drive subsystem 142, a vehicle sensor subsystem 144, and/or a vehicle control subsystem 146. The various components shown for the vehicle subsystems 142, 144, 146 are exemplary. Thus, in some embodiments, additional components can be added (e.g., an ultrasonic sensor in sensor subsystems 144 or headlights/taillights in control subsystems 146), and in some embodiments, one or more components shown in FIG. 1 can be removed without affecting the exemplary hardware and software architecture described in this patent document.

The vehicle drive subsystem 142 may include components operable to provide powered motion for the vehicle 105. In an example embodiment, the vehicle drive subsystem 142 may include an engine or motor, wheels/tires, a transmission gear, an electrical subsystem, and a power source. The vehicle control system 146 may be configured to control operation of the vehicle 105 and its components. Accordingly, the vehicle control system 146 may include various elements such as a throttle, brake units, a navigation unit, a steering system and/or an autonomous control unit.

The throttle may be configured to control, for instance, the operating speed of the engine and, in turn, control the speed of the vehicle 105. The brake units can include any combination of mechanisms configured to decelerate the vehicle 105. The brake units can use friction to slow the wheels in a standard manner. In some embodiments, the brake units can include a primary brake and a backup brake for each wheel. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from a global positioning system (GPS) transceiver and one or more predetermined maps so as to determine the driving path for the vehicle 105. The steering system may represent any combination of mechanisms such as a steering gear and a steering column that may be operable to adjust the heading of vehicle 105 in an autonomous mode or in a driver-controlled mode.

The vehicle sensor subsystem 144 may include a number of sensors configured to or designed to sense information about an environment or condition of the vehicle 105. For example, the vehicle sensor subsystem 144 may include an inertial measurement unit (IMU), a GPS transceiver, a RADAR unit, a laser range finder/LIDAR unit, and/or cameras or image capture devices. The vehicle sensor subsystem 144 may also include sensors configured to monitor internal systems of the vehicle 105 (e.g., an $O_2$ monitor, a fuel gauge, an engine oil temperature).

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. In some embodiments, the GPS transceiver can be communicably coupled to the VCU computer 150, the CU computers 160, and at least some of the sensors in the sensor subsystems 144 so that the GPS transceiver can provide a timestamp information to at least the VCU computer 150, the CU computers 160, and at least some of the sensors. As further explained in this patent document, a timestamp information can enable the at least the CU computers 160 to synchronize and process data obtained by the sensors in real-time or as the vehicle 105 is being driven.

The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. The cameras may include devices configured to capture a plurality of images of the environment surrounding the vehicle 105. For example, some the cameras may be directed to capture images from one or more regions in front of and/or towards the sides of the vehicle 105. The cameras may be still image cameras or motion video cameras. In some embodiments, the cameras may include at least some infrared cameras.

Figure 2:
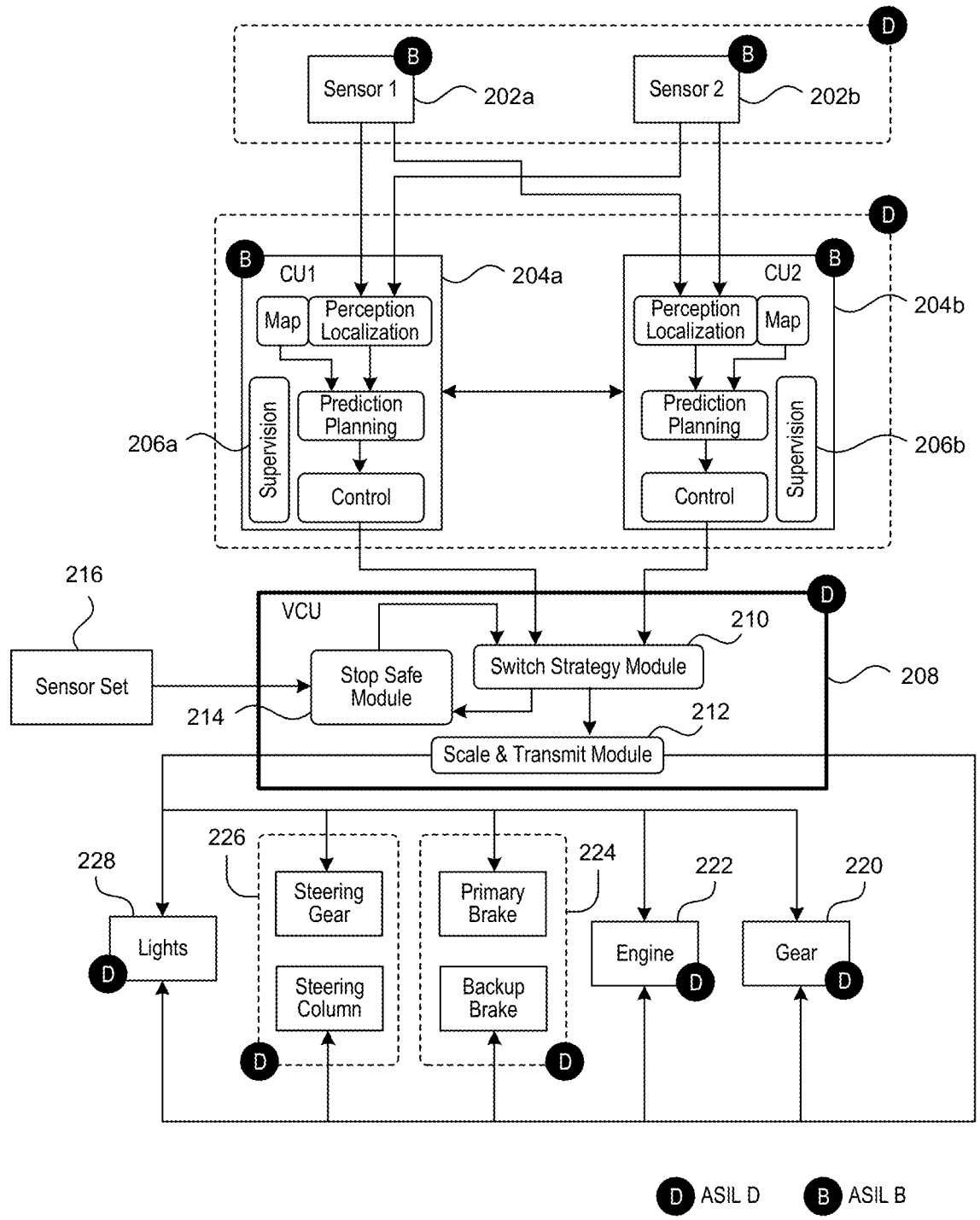
FIG. 2 shows a block diagram of an exemplary system architecture that shows the hardware and software architecture to control devices on a vehicle operated in an autonomous mode.

FIG. 2 shows a block diagram of an exemplary system architecture 200 that shows the hardware and software architecture to control devices on a vehicle that can be operated in an autonomous mode. The components shown in FIG. 2 are located on or in a vehicle. The letters "B" and "D" shown on the corner of the components are exemplary designations that indicate that the component may comply with ASIL B or ASIL D. The system architecture 200 is designed with a redundant architecture so that such the overall system architecture 200 can be complaint with the redundancy feature of ASIL D. The ASIL designations shown in FIG. 2 are exemplary, other designations may be possible. For example, the system architecture 200 can employ a redundant architecture as shown in FIG. 2 without being compliant to the ASIL levels.

The system architecture 200 includes a set of at least two redundant sensors 202a, 202b coupled to a vehicle (e.g., on the hood of a vehicle or on top of the cab of the semi-trailer truck). The at least two redundant sensors 202a, 202b obtain sensor data of a same or substantially the same aspect or characteristic being measured or obtained as the vehicle is driven. For example, the at least two redundant sensors 202a, 202b may be at least two cameras that capture or record images of a same region or substantially overlapping regions towards which the vehicle is being driven. Images from the at least two cameras may be considered to describe substantially overlapping regions if, for example, an area of an image obtained by one camera overlaps more than 90% with an area of an image obtained by another camera. In some embodiments, the at least two cameras may be adjacent to each other and may be calibrated to capture images of the same region or from substantially overlapping regions. For ease of explanation, only one set of two sensors 202a, 202b are shown in FIG. 2. Additional sets of two or more sensors can be added to the system architecture 200 and processed by the plurality of CU computers 204a, 204b, where each set of sensors can include at least two redundant sensors that operate in a redundant scheme as explained for sensors 202a, 202b.

In another example, the at least two redundant sensors 202a, 202b may be two LiDAR sensors located on the front of the vehicle (e.g., coupled to the hood of the engine compartment). In this second example, the at least two LiDAR sensors can measure distances to various objects (e.g., other vehicles or terrain) in a same region or substantially overlapping regions towards which the vehicle is being driven. In some example implementations, the at least two redundant sensors 202a, 202b may be at least two Radars or at least two infrared cameras or at least two ultrasonic sensors.

The at least two redundant sensors 202a, 202b that obtain sensor data of a same or substantially the same aspect or characteristic can be considered to operate in a redundant scheme at least because the first sensor 202a can continue to provide reliable data if the second sensor 202b fails. Thus, as shown in FIG. 2, the combination of the at least two redundant sensors 202a, 202b can be considered to comply with the redundancy feature of ASIL D.

Each sensor has at least two outputs that provide the same measured or obtained sensor data to the plurality of CU computers 204a, 204b. For example, sensor 202a is shown to have two outputs where a first output is sent to CU1 computer 204a, and a second output is sent to CU2 computer 204b. Thus, each sensor of each set of sensors is communicably coupled to each of the plurality of CU computers 204b.

The sensor data that is sent by each sensor to the plurality of CU computers 204a, 204b can include a time synchronization related information. In a first example implementation, each sensor 202a, 202b, each CU computer 204a, 204b, and the VCU computer 208 can be communicably coupled to and receive a timestamp information from a GPS transceiver in the vehicle (shown in FIG. 1 in vehicle sensor subsystem 144). The VCU computer 208 can be implemented as 2 ASIL B (or ASIL D) components as an alternative solution. A precision time protocol (PTP) can be used to provide synchronized clock or timestamp information (e.g., absolute time) to at least the sensors 202a, 202b, the CU computers 204a, 204b, and the VCU computer 208. The timestamp information provided by the GPS transceiver or via PTP or another technique can enable the sensors 202a, 202b to output sensor data with the timestamp data so that at least the CU computers 204a, 204b can process data obtained by the sensors 202a, 202b in a synchronized manner.

The CU1 computer 204a and CU2 computer 204b receive the output of each sensor with the timestamp information. As shown in FIG. 2 and further shown in FIG. 4, each CU computer includes a map database, a perception and localization module, a prediction and planning module, a control module, and a supervision module. The two CU computers 204a, 204b process the sensor data provided by the at least two redundant sensors 202a, 202b by performing the same set of operations for the various modules shown in each CU computer as further explained in this patent document. The two CU computers 204a, 204b operate in a redundant architecture by simultaneously processing the received sensor data. In some embodiments, the two CU computers 204a, 204b can simultaneously process the received sensor data based at least on the timestamp information included in the sensor data and on absolute or relative time value (e.g., timestamp) provided to each CU computer by, for example, the GPS transceiver. The two CU computers 204a, 204b may be considered to simultaneously process the received sensor data by performing a same operation within a pre-determined tolerance range (e.g., 10 µs) of the absolute or relative time value provided to each CU computer.

The two CU computers 204a, 204b operate in a redundant architecture by simultaneously performing the operations related to the perception and localization module, the prediction and planning module, the control module, and the supervision module. The double-sided arrow shown in between CU1 computer 202a and CU2 computer 202b indicate that the two CU computers either can receive signals from each other to indicate that they are operating or can request and receive signals from each other to indicate that they are operating properly. As further explained herein, the modules in each CU computer can receive and process the sensor data from the at least two redundant sensors 202a, 202b, and output at a set of output values to control devices 220-228 located in the vehicle that operate according to the set of output values to enable the vehicle to be driven.

The perception and localization module, prediction and planning module, map database, and control module are shown for illustrative purposes. The perception and localization module can enable each CU computer to perform image processing on images obtained from a plurality of cameras located on the autonomous vehicle to determine presence and/or locations of one or more objects in front of or around the autonomous vehicle. Based on this location information of the one or more objects and based on information about the roads/highways on which the autonomous vehicle is being driven (which can be obtained from a map database), the prediction and planning module can determine a trajectory on which the autonomous vehicle is to be driven. The prediction and planning module can provide the trajectory information and location(s) of the one or more objects to the control module that can determine a set of output values to control devices 220-228 located in the vehicle based on the trajectory information and the location(s) of the object(s). In some embodiments, other modules can be included in each CU computer. In some embodiments, each CU computer can include fewer than the modules shown in FIG. 2.

The control module of each CU computer can generate a set of output values with which the VCU computer 208 can control the devices 220-228 that operate to enable the vehicle to be driven as further explained in this patent document. The set of output values may include (1) a gear value that indicates what gear is the transmission 220 is to operate in, (2) the throttle/torque value that can indicate an amount of torque to be applied by the engine 222, (3) braking value that indicates an amount of brakes to be applied by the primary and/or backup brakes 224, (4) steering value that can indicate an amount and/or rate of steering to be applied by the steering system 226, and/or (5) light mode values that can indicate mode of operating the lights 228 (e.g., headline on/off and/or taillight on/off/ emergency lights). As shown in FIG. 2, the least two CU computers 204a, 204b can generate two sets of output values and send these two sends to the VCU computer 208. In some embodiments the VCU computer 208 can use at least one of the sets of values to control or command the devices 220-228 to operate according to the set of values to enable the vehicle to be driven or operated.

A supervision module 206a, 206b can monitor the execution of the code by each the perception and localization module, the prediction and planning module and the control module. For example, the supervision module 206a, 206b can monitor a number of tasks, CPU load, execution time, memory usage for the software code execution performed by each of the perception and localization module, the prediction and planning module and the control module. In some embodiments, for each of the perception and localization module, the prediction and planning module and the control module, the supervision module 206a, 206b can have a set of pre-determined threshold values for number of tasks, CPU load, execution time, memory usage. Thus, for example, if the supervision module 206a, 206b determines that a measured value for CPU load for the control module exceeds its pre-determined value, then the supervision module 206a, 206b can generate and send a fault or error message to the switch strategy module 210 (also shown as 525 in FIG. 5) of the VCU computer 208, where the fault or error message indicates that the CPU load for the control module has exceeded a limit. For each of the number of tasks, CPU load, execution time, memory usage, if a value measured by the supervision module 206a, 206b exceeds its corresponding pre-determined threshold, then the supervision module 206a, 206b can generate and send a fault or error message indicating the type of error to the switch strategy module 210 of the VCU computer 208.

In some embodiments, the supervision module 206a, 206b can also monitor the state of health of the hardware and/or software interface. For example, the supervision module 206a, 206b on a CU computer can also monitor a temperature from a temperature sensor coupled to the CU computer. In such embodiments, the supervision module 206a, 206b can have a pre-determined threshold value for the temperature so that if the supervision module 206a, 206b determines that a temperature of the CU computer measured by the temperature sensor exceeds the pre-determined threshold value, the supervision module 206a, 206b will send an error or fault message to the switch and strategy module with an indication of on over-temperature condition.

The VCU computer 208 is communicably coupled to the plurality of CU computers 204a, 204b. The VCU computer 208 includes a switch strategy module 210 that receives two sets of output values—one from each control module of each CU computer—to control devices 220-228. Since the modules in both CU computers 204a, 204b can execute identical software code, the set of output values provided by the control module of CU1 computer 204a should be the same as the set of output values provided by the control module of CU2 computer 204b. As mentioned above, the switch strategy module 210 can also receive a fault or error message generated by the supervision module 206a, 206b of each CU computer.

The fault or error message from CU1 and/or CU2 indicates a state of health of CU1 and/or CU2. Based on the status of the fault or error message from the CU1 computer 204a or the CU2 computer 204b or both, the switch strategy module 210 can determine whether the set of output values from the CU1 computer 204a should be sent to the scale and transmit module 212 (also shown as 525 in FIG. 5) of the VCU computer 208 to control one or more devices 220-228, or whether the set of output values from the CU2 computer 204b should be sent to the scale and transmit module 212 to control one or more devices 220-228, or whether neither sets of output values from CU1 and CU2 computers 204a, 204b should be sent to the scale and transmit module 212. If the switch strategy module 210 receives a fault or error message from only one of the supervision modules (e.g., from the supervision module 206b from the CU2 computer 204b), then the switch strategy module 210 can select and send the set of output values from the other CU computer (e.g., from CU1 computer 204a) to the scale and transmit module 212.

In some embodiments, the reception of a fault or error message from one of the supervision modules can trigger the switch strategy module 210 to select and send the set of output values from the CU computer that did not sent the fault or error message. In some embodiments, the switch strategy module 210 can receive and analyze the fault or error message to determine whether to select and send the set of output values from the CU computer that did not sent the fault or error message. For example, if the fault or error message is generated because a measured temperature of a CU is greater than a first pre-determined limit and if this information is provided in the fault or error message to the switch strategy module, but if the switch strategy module 210 determines that the measured temperature is within an acceptable limit (e.g., less than a second pre-determined limit higher than the first pre-determined limit), then the switch strategy module 210 can select and send either set of output values from either CU1 computer 204a or CU2 computer 204b to the scale and transmit module 212. Thus, in some embodiments, the switch strategy module 210 can determine which one of the two or more sets of output values to select and send to the scale and transmit module 212 based on the information provided by the fault or error message.

If the switch strategy module 210 does not receive any fault or error message from any of the supervision modules 206a, 206b of the CU computers 204a, 204b, then the switch strategy module 210 can select and send either set of output values from either CU1 computer 204a or CU2 computer 204b to the scale and transmit module 212. In some embodiments, if one of the CU computers (e.g., 204b) fails or stops sending the set of output values to the switch strategy module 210, the switch strategy module 210 can determine that the CU computer (e.g., 204b) is not functioning properly and will use the set of output values received from the other CU computer (e.g., 204a).

The VCU 208 is communicably coupled to the one or more devices 220-228. Thus, when the scale and transmit module 212 receives a set of output values to control one or more devices 220-228, the scale and transmit module 212 translates the values indicated in the set of output values and sends commands to devices 220-228 to operate the vehicle. In a vehicle, the gear 220, engine 222, brake system 224, steering system 226, and lights 228 can be supplied by different original equipment manufacturers (OEMs). Thus, for example, the instruction or commands used to operate the light 228 are both different and complex compared to the instructions or commands used to operate the engine 222. The commands sent to the devices 220-228 can be made over a multiplexed communication bus. Thus, the scale and transmit module 212 translating the values in the set of output values is an advantageous feature at least because such an operation allows the VCU computer 208 to instruct or command the various devices 220-228 to operate in a manner indicated by their respective values. For example, the scale and transmit module 212 can translate the values by converting the values to a format understood by the devices 220-228 or by including the values in a pre-determined syntax to command the devices 220-228.

In some embodiments, the scale and transmit module 212 can store in a vehicle component database (shown as 540 in FIG. 5) a table of commands that can enable the scale and transmit module 212 to format a set of values obtained in the set of output values to another set of values used to control the devices 220-228. For example, if the scale and transmit module 212 receives a value of 0.2 (out of 1) for throttle and a value of 2 (out of 10 gears) for the transmission gear, then the scale and transmit module 212 can use the vehicle component database to obtain a command for the engine to command the engine to increase its fuel and/or air intake to have a throttle of 0.2, and the scale and transmit module 212 can use the vehicle component database to obtain another command for the transmission to command the transmission to change or maintain its gear to 2.

The VCU computer 208 also includes a stop safe module 214 (also shown as 535 in FIG. 5) that can be triggered to bring the vehicle to a complete stop if both the CU computers 204a, 204b experience a fault or error condition. For example, if the switch strategy module 210 receives fault or error messages from both supervision modules 206a, 206b of CU computers 204a, 204b at the same time or at different times, then the switch strategy module 210 determines not to send any of the two sets of output values from the CU computers 204a, 204b to the scale and transmit module 212. Instead, the switch strategy module 210 sends a trigger signal to the stop safe module 214, where the trigger signal indicates that the stop safe module 214 can initiate a process to bring the vehicle to a complete stop.

The switch strategy module 210 receives a safe stop trajectory information (also known as emergency trajectory information) from the control module or from the prediction and planning module of each CU computer. The safe stop trajectory information indicates a predicted trajectory of the vehicle over some distance in front of the vehicle to bring the vehicle to a complete stop. For example, if a vehicle is being driven on a highway, the trajectory information indicates at any given location of the vehicle a predicted trajectory over some distance (e.g., the next 500 feet in front of the vehicle) to bring the vehicle to a complete stop in case of an emergency. The distance can be long enough to achieve a complete stop by the vehicle and can vary based on the speed of the vehicle. The safe top trajectory information can be considered to indicate a predicted trajectory over a pre-determined future length of time (e.g., over the next 30 seconds or next 1-minute or longer) from the location of the vehicle and based on the speed of the vehicle. In some embodiment, the switch strategy module 210 can send the safe stop trajectory information to the stop safe module 214 for storage. The stop safe module 214 or the switch strategy module 210 can store the safe stop trajectory information in memory (shown as 505 in FIG. 5) or on a storage device (e.g., hard drive) so that if both the CU computers 204a, 204b experience a fault or error condition the stop safe module 214 can safely bring the vehicle to a complete stop by retrieving and processing the stored safe stop trajectory information with the sensor data obtained from the set of sensors 216. In some embodiments, the safe stop trajectory information may be stored periodically (e.g., every second) so that the stop safe module 214 can have the most up to date safe stop trajectory information to stop the vehicle in case of an emergency.

The VCU computer 208 is communicably coupled to a set of sensors 216 so that the stop safe module 214 can obtain the sensor data from a set of sensors 216. The sensor data from the set of sensors 216 measures one or more regions towards which the vehicle is being driven. The set of sensors 216 may be different from the sets of sensors (e.g., 202a, 202b) that send sensor data to the plurality of CU computers 204a, 204b. A separate set of sensors 216 for the stop safe module is a beneficial technical feature at least because such an architecture can enable the stop safe module to bring the vehicle to a complete stop even if both the CU computers 204a, 204b and/or the sets of sensors that provide sensor data to the CU computers 204a, 204b stop functioning properly. The set of sensors 216 may include at least two redundant sensors that are similar to those described for sensors 202a, 202b. The set of sensors 216 may be communicably coupled to a GPS transceiver in the vehicle so that the set of sensors 216 may provide an output (e.g., image or measured data) to the stop safe module where the output may be timestamped.

The stop safe module 214 can generate a set of output values to control the one or more devices 220-228, where the set of output values can be based on the sensor data, safe stop trajectory information, and the techniques describe for the perception and localization module and the control module, as described in this patent document. Thus, the set of output values generated by the stop safe module 214 can be obtained using the same modules as those described in this patent document for the CU computers 204a, 204b for generating the two sets of output values. The stop safe module 214 sends the generated set of output values to the switch strategy module 210 that sends it to the scale and transmit module 212 to control the one or more devices 220-228 as described in this patent document. In some embodiments, when the stop safe module 214 generate a set of output values, the output values include a light mode value for the taillight to engage its emergency lights. Since stop safe module 214 is triggered as part of an emergency condition, set of output values generated by the stop safe module 214 can include a value to indicate to the taillight to turn on its emergency lights.

Figure 3:
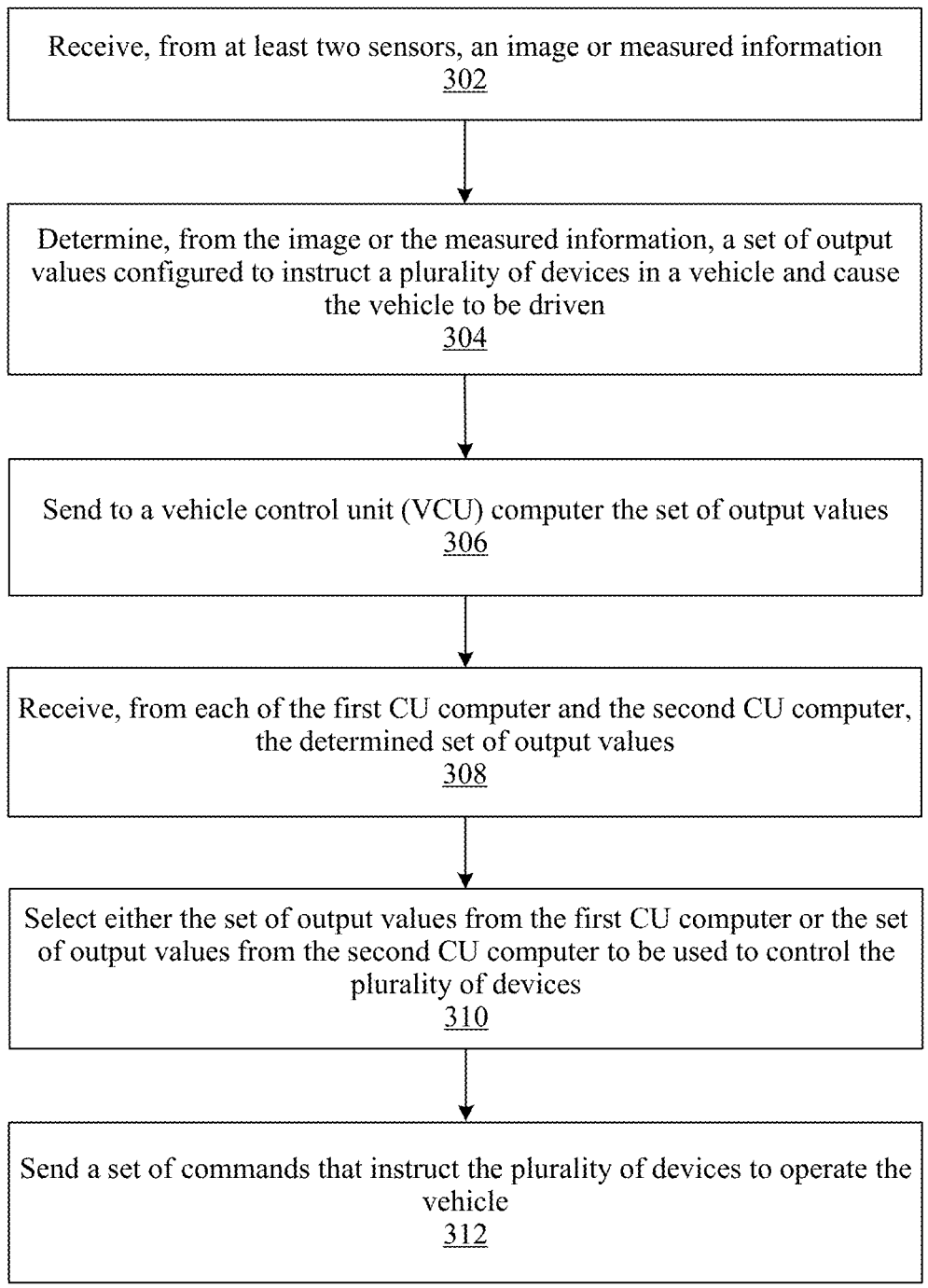
FIG. 3 shows an exemplary flow diagram of the operations performed by each of the computing unit (CU) computers and the vehicle control unit (VCU) computer in an exemplary system architecture.

FIG. 3 shows an exemplary flow diagram of the operations performed by each of the CU computers and the VCU computer in an exemplary system architecture. Operations 302 to 306 can be performed by each of a first computing unit (CU) computer and a second computing unit (CU) computer located in a vehicle (e.g., semi-trailer truck), and operations 308 to 314 can be performed by the VCU computer located in the vehicle. The processor of each of the first CU computer and the second CU computer is configured to simultaneously perform at least operations 302-306.

At the receiving operation 302, the perception and localization module can receive, from the at least two redundant sensors, an image or measured information from at least two redundant sensors. The at least two redundant sensors may comprise a set of a same type of sensors that are coupled to a vehicle. The at least two redundant sensors are configured to obtain an image of or to measure information about a same region or substantially overlapping regions towards which the vehicle is being driven, and each sensor is configured to send the image or the measured information to a first CU computer and a second CU computer. The at least two redundant sensors can have identical dual outputs.

At the determining operation 304, the prediction and planning module and/or the control module can determine, from the image or the measured information, a set of output values configured to instruct a plurality of devices in a vehicle and cause the vehicle to be driven. At the sending operation 306, the control module can send to a vehicle control unit (VCU) computer the set of output values.

At the receiving operation 308, the switch strategy module of the VCU receives, from each of the first CU computer and the second CU computer, the determined set of output values that instruct the plurality of devices in the vehicle and cause the vehicle to be driven. At the selecting operation 310, the switch strategy module selects either the set of output values from the first CU computer or the set of output values from the second CU computer to be used to control the plurality of devices. The switch strategy module can perform the selecting operation 310 based on information received from any one or both of CU computers 204a, 204b as described in this patent document for FIG. 2.

In some embodiments, at the selecting operation 310, the VCU receives the sets of output values from both CUs but determines to use the set of output values from a first CU computer. At the sending operation 312, the scale and transmit module sends a set of commands that instruct the plurality of devices to operate the vehicle, where the set of commands are based on the selected set of output values. For example, the scale and transmit module translates the selected set of output values to a set of commands that are sent to the plurality of devices to operate the vehicle.

In some embodiments, each of the first CU computer and the second CU computer comprises the processor that is further configured to perform the operations to: determine, from the image or the measured information, an emergency trajectory information that indicates a predicted trajectory of the vehicle over a known distance from a location of the vehicle to bring the vehicle to a complete stop; and send the emergency trajectory information to the VCU computer. The VCU computer comprises the processor that is further configured to: receive, from each of the first CU computer and the second CU computer, the emergency trajectory information; store the emergency trajectory information, where the stored emergency trajectory information is used when the first CU computer and the second CU computer generate messages indicative of an error or fault condition.

In some embodiments, the VCU computer comprises the processor that is further configured to: receive, from the first CU computer and the second CU computer, the messages indicative of the error or fault condition in the first CU computer and the second CU computer when performing the operations; and in response to receiving the messages: retrieve the stored emergency trajectory information; obtain, from a second set of at least two redundant sensors (e.g., at least two redundant cameras) coupled to the vehicle, at least two images or at least two measured information of a same region or substantially overlapping regions towards which the vehicle is being driven; determine, based on at least one image or the at least one measured information obtained from the second set of the at least two redundant sensors and the retrieved emergency trajectory information, a second set of output values that control the plurality of devices in the vehicle to bring the vehicle to a complete stop; and cause the vehicle to be brought to a complete step by sending a second set of commands that instruct the plurality of devices, wherein the second set of commands are based on the second set of output values. The second set of commands can be obtained by translating (or converting) the second set of output values to the second set of commands that instruct the plurality of devices to operate in accordance with the second set of output values to bring the vehicle to a complete stop. In some embodiments, the second set of commands cause an emergency lights of taillights located on the vehicle to be turned on.

In some embodiments, the VCU computer comprises the processor that is further configured to: receive, from the first CU computer, a message indicative of an error or fault condition in the first CU computer when performing the operations; and in response to receiving the message: select the set of output values from the second CU computer to be used to control the plurality of devices; and send the set of commands that instruct the plurality of devices to operate the vehicle, wherein the set of commands are based on the selected set of output values from the second CU computer.

In some embodiments, the processor of the VCU computer is configured to select either the set of output values from the first CU computer or the set of output values from the second CU computer based on a first state of health of the first CU computer or a second state of health of the second CU computer. In some embodiments, the plurality of devices include a transmission, an engine, brakes, a steering system, or a light (e.g., headlight and/or taillight). In some embodiments, the set of sensors include at least two cameras, at least two LiDAR sensors, at least two RADAR sensors, at least two infrared cameras, at least two ultrasonic sensors, or any combination thereof.

Figure 4:
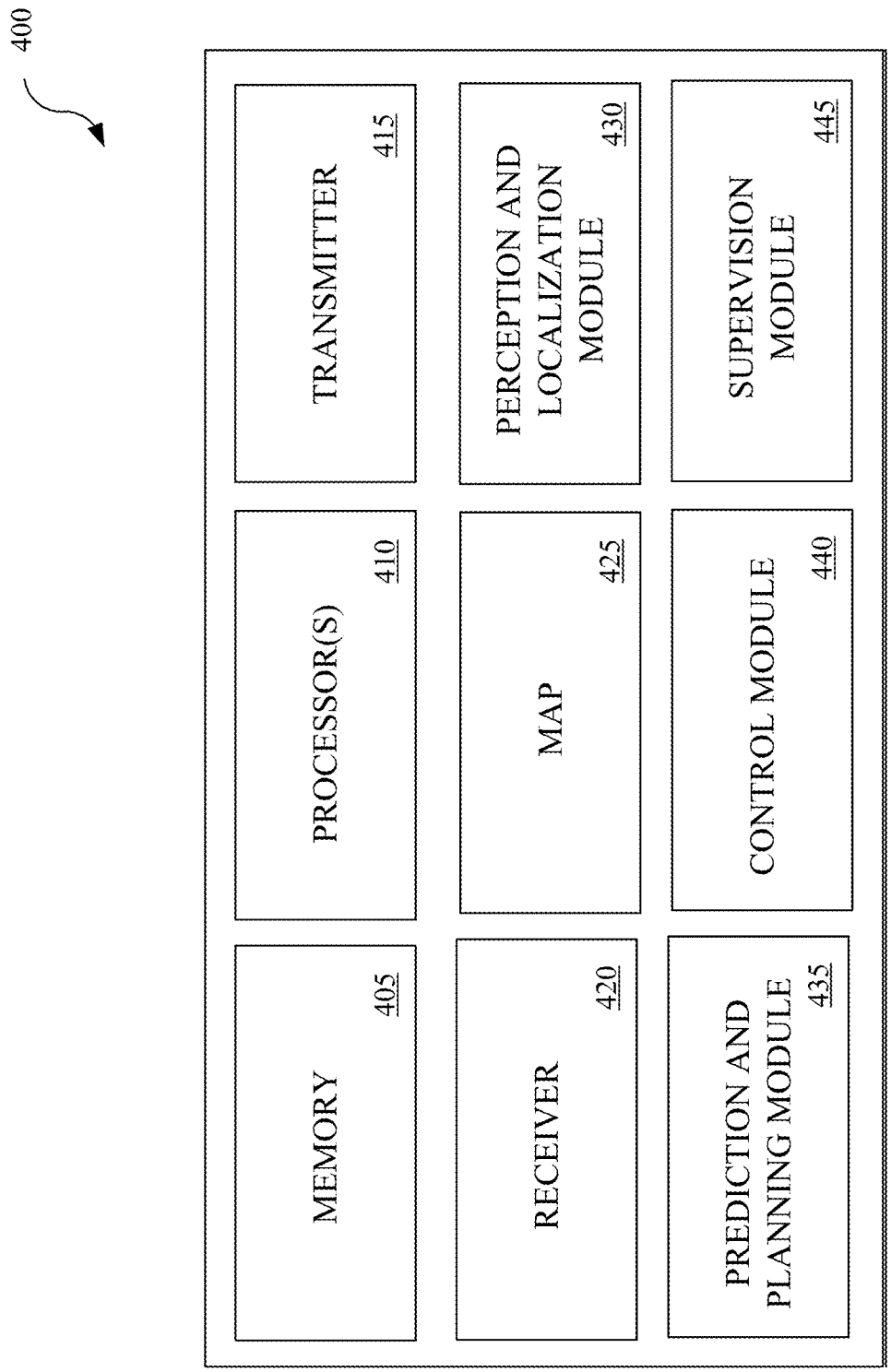
FIG. 4 shows an exemplary block diagram of a CU computer located in a vehicle.

FIG. 4 shows an exemplary block diagram of a CU computer 400 located in a vehicle. The CU computer 400 includes at least one processor 410 and a memory 405 having instructions stored thereupon. The instructions upon execution by the processor 410 configure the CU computer 400 to perform the operations described in FIGS. 1 to 3 and in the various embodiments described in this patent document. The transmitter 415 transmits or sends the set of output values to control one or more devices on the vehicle to a VCU computer. The receiver 420 receives information or data transmitted or sent by the multiple sets of sensors. Each of the plurality of CU computers includes at least the features of the CU computer 400 shown in FIG. 4.

Figure 5:
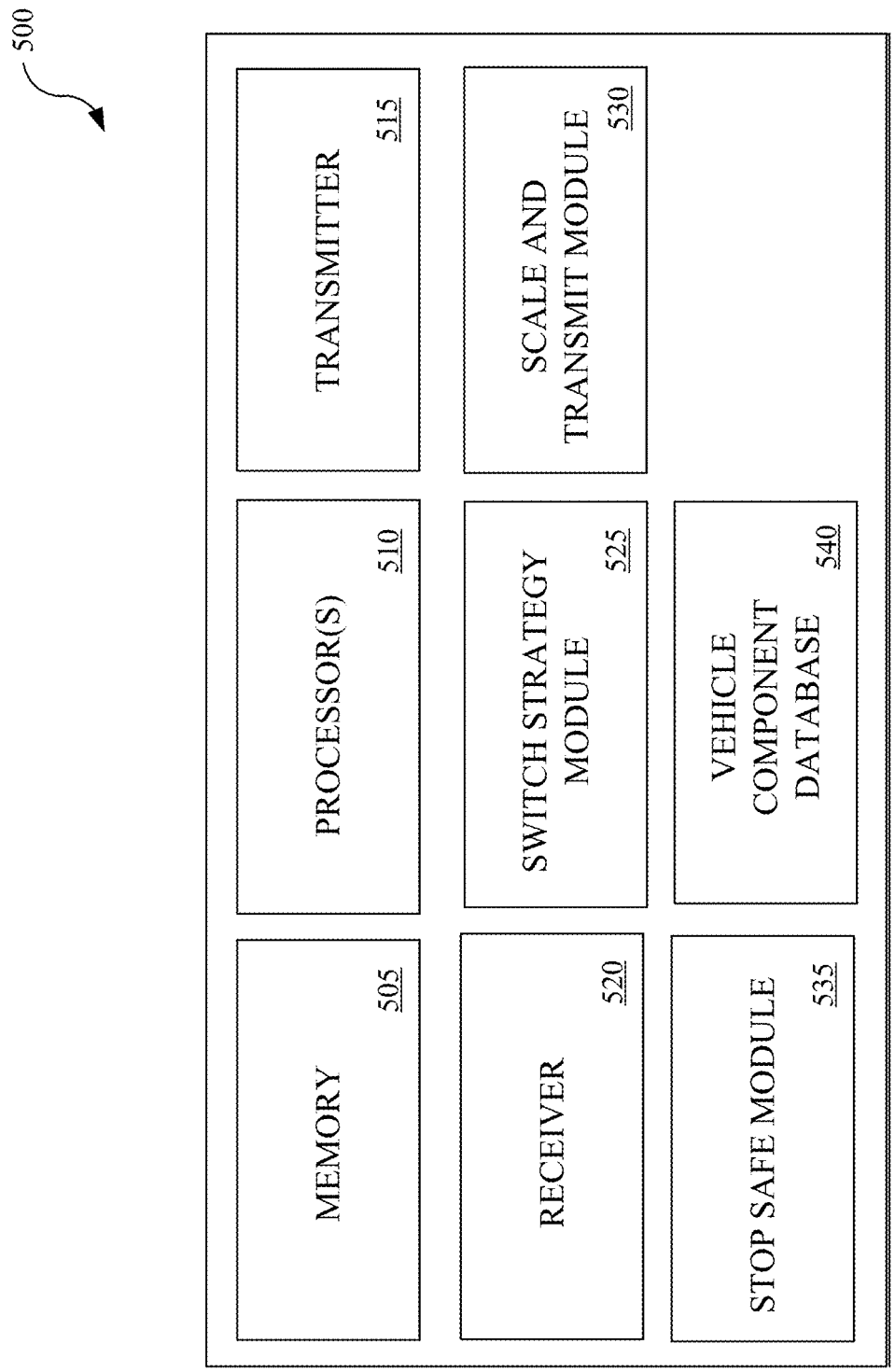
FIG. 5 shows an exemplary block diagram of a VCU computer located in a vehicle.

FIG. 5 shows an exemplary block diagram of a VCU computer 500 located in a vehicle. The VCU computer 500 includes at least one processor 510 and a memory 505 having instructions stored thereupon. The instructions upon execution by the processor 510 configure the VCU computer 500 to perform the operations described in FIGS. 1 to 3 and in the various embodiments described in this patent document. The transmitter 515 transmits or sends instructions or commands from the scale and transmit module 530 to a device on a vehicle (e.g., engine or brakes). The receiver 520 receives information or data transmitted or sent by the plurality of CU computers or by one or more devices on the vehicle (e.g., status of the engine or transmission). In some embodiments, the VCU computer 500 may represent a plurality of computers or servers that may serve to control individual components or subsystems of a vehicle in a distributed fashion. The plurality of computers or servers that represent the VCU computer 500 may compose any ASIL decomposition B+B, as an example.

In this patent document, the terms "drive" or "driven" can include the vehicle being in motion, or the vehicle stopped at a location (e.g., stop sign) with its engine running, or the vehicle that is turned on and parked. In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A system, comprising:
a set of at least two redundant sensors coupled to a vehicle,
wherein each sensor is configured to obtain an image of or to measure information about a same region or substantially overlapping regions towards which the vehicle is being driven, and
wherein each sensor is configured to send the image or the measured information to a first computing unit (CU) computer and a second CU computer;
each of the first CU computer and the second CU computer located in the vehicle and comprising a processor configured to simultaneously perform operations comprising:

receive, from each sensor, the image or the measured information;

determine, from the image or the measured information, a set of output values configured to instruct a plurality of devices in the vehicle and cause the vehicle to be driven;

send to a vehicle control unit (VCU) computer the set of output values;

the VCU computer located in the vehicle and comprising second processor configured to:

receive, from each of the first CU computer and the second CU computer, the determined set of output values;

receive, from the first CU computer, a message indicative of an error or fault condition in the first CU computer when performing the operations, wherein the message is received in response to a temperature of the first CU computer being greater than a first pre-determined limit;

select either the set of output values from the first CU computer or the set of output values from the second CU computer to be used to control the plurality of devices in response to determining that the temperature of the first CU computer is less than a second pre-determined limit that is greater than the first pre-determined limit; and send a set of commands that instruct the plurality of devices to operate the vehicle, wherein the set of commands are determined by a conversion of the selected set of output values into another set of output values using a stored database of commands, wherein the another set of output values are formatted for the plurality of devices and that are included in the set of commands.

2. The system of claim 1, wherein each of the first CU computer and the second CU computer comprises the processor that is further configured to perform the operations to:

determine, from the image or the measured information, an emergency trajectory information that indicates a predicted trajectory of the vehicle over a known distance from a location of the vehicle to bring the vehicle to a complete stop; and send the emergency trajectory information to the VCU computer;

wherein the VCU computer comprises the second processor that is further configured to:

receive, from each of the first CU computer and the second CU computer, the emergency trajectory information; and store the emergency trajectory information, wherein the stored emergency trajectory information is used when the first CU computer and the second CU computer generate messages indicative of an error or fault condition.

3. The system of claim 2, wherein the VCU computer comprises the second processor that is further configured to:

receive, from the first CU computer and the second CU computer, the messages indicative of the error or fault condition in the first CU computer and the second CU computer when performing the operations; and in response to receiving the messages:

retrieve the stored emergency trajectory information;

obtain, from a second set of at least two redundant sensors coupled to the vehicle, at least two images or at least two measured information of the same region or the substantially overlapping regions towards which the vehicle is being driven;

determine, based on at least one image or at least one measured information obtained from the second set of the at least two redundant sensors and the emergency trajectory information, a second set of output values that control the plurality of devices in the vehicle to bring the vehicle to a complete stop; and cause the vehicle to be brought to a complete stop by sending a second set of commands that instruct the plurality of devices, wherein the second set of commands are based on the second set of output values.

4. The system of claim 3, wherein the second set of commands cause an emergency lights of taillights located on the vehicle to be turned on.

5. The system of claim 1, wherein the VCU computer comprises the second processor that is further configured to:

in response to receiving the message:

select the set of output values from the second CU computer to be used to control the plurality of devices; and send the set of commands that instruct the plurality of devices to operate the vehicle, wherein the set of commands are based on the selected set of output values from the second CU computer.

6. The system of claim 1, wherein the second processor of the VCU computer is configured to select either the set of output values from the first CU computer or the set of output values from the second CU computer based on a first state of health of the first CU computer or a second state of health of the second CU computer.

7. The system of claim 1, wherein the plurality of devices include a transmission, an engine, brakes, a steering system, or a light.

8. The system of claim 1, wherein the set of the at least two redundant sensors include at least two cameras, at least two LiDAR sensors, at least two RADAR sensors, at least two infrared cameras, at least two ultrasonic sensors, or any combination thereof.

9. An apparatus for autonomous vehicle operation comprising a processor, configured to implement a method, comprising:

receive, from each of a first computing unit (CU) computer and a second computing unit (CU) computer, a set of output values configured to instruct a plurality of devices in a vehicle and cause the vehicle to be driven, wherein the set of output values are determined based on an image or measured information provided by a set of at least two redundant sensors coupled to the vehicle;

receive, from the first CU computer, a message indicative of an error or fault condition in the first CU computer when performing the operations, wherein the message is received in response to a temperature of the first CU computer being greater than a first pre-determined limit;

select either the set of output values from the first CU computer or the set of output values from the second CU computer to be used to control the plurality of devices in response to determining that the temperature of the first CU computer is less than a second pre-determined limit that is greater than the first pre-determined limit; and send a set of commands that instruct the plurality of devices to operate the vehicle, wherein the set of commands are determined by a conversion of the selected set of output values into another set of output values using a stored database of commands, wherein the another set of output values are formatted for the plurality of devices and that are included in the set of commands.

10. The apparatus of claim 9, wherein the processor is configured to implement the method that further comprises:
receive, from the first CU computer and the second CU computer, messages indicative of an error or fault condition in the first CU computer and the second CU computer; and in response to receiving the messages:
retrieve a stored emergency trajectory information that indicates a predicted trajectory of the vehicle over a known distance from a location of the vehicle to bring the vehicle to a complete stop;
obtain, from at least two redundant cameras coupled to the vehicle, at least two images of a same region or substantially overlapping regions towards which the vehicle is being driven;
determine, based on at least one image from the at least two redundant cameras and the emergency trajectory information, a second set of output values that control the plurality of devices in the vehicle to bring the vehicle to a complete stop; and
cause the vehicle to be brought to a complete stop by sending a second set of commands that instruct the plurality of devices, wherein the second set of commands are based on the second set of output values.

11. The apparatus of claim 9, wherein the processor is configured to implement the method that further comprises:
in response to receiving the message:
select the set of output values from the second CU computer to be used to control the plurality of devices; and
send the set of commands that instruct the plurality of devices to operate the vehicle, wherein the set of commands are based on the selected set of output values from the second CU computer.

12. The apparatus of claim 9, wherein the processor is configured to select the set of output values from the first CU computer based on a state of health of the second CU computer.

13. The apparatus of claim 9, wherein the set of the at least two redundant sensors include at least two cameras.

14. A non-transitory computer readable program storage medium having code stored thereon, the code, when executed by a processor, causing the processor to implement a method, comprising:
receiving, from each of a first computing unit (CU) computer and a second computing unit (CU) computer, a set of output values configured to instruct a plurality of devices in a vehicle and cause the vehicle to be driven,
wherein the set of output values are determined based on an image or measured information provided by a set of at least two redundant sensors coupled to the vehicle;
receiving, from the first CU computer, a message indicative of an error or fault condition in the first CU computer when performing the operations, wherein the message is received in response to a temperature of the first CU computer being greater than a first pre-determined limit;
selecting either the set of output values from the first CU computer or the set of output values from the second CU computer to be used to control the plurality of devices; and
sending a set of commands that instruct the plurality of devices to operate the vehicle, wherein the set of commands are determined by converting the selected set of output values into another set of output values using a stored database of commands, wherein the another set of output values are formatted for the plurality of devices and that are included in the set of commands.

15. The non-transitory computer readable program storage medium of claim 14, wherein the method further comprises:
receiving, from the first CU computer and the second CU computer, messages indicative of an error or fault condition in the first CU computer and the second CU computer; and in response to receiving the messages:
obtaining an emergency trajectory information that indicates a predicted trajectory of the vehicle over a known distance from a location of the vehicle to bring the vehicle to a complete stop;
obtaining, from at least two redundant cameras coupled to the vehicle, at least two images of a same region or substantially overlapping regions towards which the vehicle is being driven;
determining, based on at least one image from the at least two redundant cameras and the emergency trajectory information, a second set of output values that control the plurality of devices in the vehicle to bring the vehicle to a complete stop; and
causing the vehicle to be brought to a complete stop by sending a second set of commands that instruct the plurality of devices, wherein the second set of commands are based on a translation of the second set of output values.

16. The non-transitory computer readable program storage medium of claim 15, wherein the messages are received at different times.

17. The non-transitory computer readable program storage medium of claim 14, wherein the method further comprises:
in response to receiving the message:
selecting the set of output values from the second CU computer to be used to control the plurality of devices; and
sending the set of commands that instruct the plurality of devices to operate the vehicle, wherein the set of commands are based on a translation of the selected set of output values from the second CU computer.

18. The non-transitory computer readable program storage medium of claim 17, wherein the set of output values from the second CU computer is selected in response to receiving the message and based on an analysis of a content of the message.

19. The non-transitory computer readable program storage medium of claim 14, wherein the set of the at least two redundant sensors include at least two LiDARs.

20. The non-transitory computer readable program storage medium of claim 14, wherein each sensor is configured to obtain the image of or to measure information about a same region or substantially overlapping regions towards which the vehicle is being driven.

* * * * *